US011538331B2

(12) United States Patent
Varughese et al.

(10) Patent No.: US 11,538,331 B2
(45) Date of Patent: Dec. 27, 2022

(54) UWB AND BLE BASED INCIDENT REPORTING AND PREVENTING SYSTEM IMPLEMENTED USING MOBILE ACCESS DEVICES

(71) Applicants: DENSO International America, Inc., Southfield, MI (US); DENSO CORPORATION, Kariya (JP)

(72) Inventors: Sibu Varughese, Sterling Heights, MI (US); Martin Nespolo, Grosse Pointe Woods, MI (US); Gareth Webb, New Hudson, MI (US); Thomas Krzyzak, Livonia, MI (US); Wilson Yim, Troy, MI (US); Matthew Johnson, Royal Oak, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/942,956

(22) Filed: Jul. 30, 2020

(65) Prior Publication Data

US 2022/0036723 A1 Feb. 3, 2022

(51) Int. Cl.
*G08B 25/01* (2006.01)
*H04W 76/50* (2018.01)
(Continued)

(52) U.S. Cl.
CPC .......... *G08B 25/016* (2013.01); *H04W 4/022* (2013.01); *H04W 4/029* (2018.02); *H04W 4/90* (2018.02); *H04W 76/11* (2018.02); *H04W 76/50* (2018.02)

(58) Field of Classification Search
CPC .... G08B 25/016; H04W 4/022; H04W 4/029; H04W 4/90; H04W 76/11; H04W 76/50
See application file for complete search history.

(56) References Cited

U.S. PATENT DOCUMENTS 9,374,673 B2 * 6/2016 Mendelson ........... H04W 4/024
9,688,247 B1    6/2017 Jayaraman et al.
(Continued)

FOREIGN PATENT DOCUMENTS

BR    102014017465 A2    2/2016
CN    104574593 A         4/2015
(Continued)

*Primary Examiner* — Minjung Kim
(74) *Attorney, Agent, or Firm* — Harness, Dickey & Pierce, P.L.C.

(57) ABSTRACT

A mobile access device includes a memory, a transceiver and a control module. The memory is configured to store incident information. The transceiver is configured to report the incident information to a relay station. The transceiver is at least one of ultra-wideband enabled or personal area network enabled. The control module is configured to: execute an emergency alerting application; transmit an alert signal from the mobile access device to the relay station indicating an incident has occurred; collect the incident information including at least one of (i) capturing audio or video of the incident, or (ii) receiving a descriptive comments from a user of the mobile access device; generate a report message including the incident information; and perform countermeasures including sending the report message to the relay station. At least one of the alert signal or the report message includes a unique signal identifier.

25 Claims, 9 Drawing Sheets

(51) Int. Cl.
  *H04W 4/90* (2018.01)
  *H04W 4/021* (2018.01)
  *H04W 4/029* (2018.01)
  *H04W 76/11* (2018.01)

(56) References Cited

U.S. PATENT DOCUMENTS

| | | | |
|---|---|---|---|
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 10,244,476 B2 | 3/2019 | Elangovan et al. | |
| 10,328,898 B2 | 6/2019 | Golsch et al. | |
| 10,328,899 B2 | 6/2019 | Golsch | |
| 10,328,900 B1 | 6/2019 | Yakovenko et al. | |
| 2004/0239498 A1* | 12/2004 | Miller | G08B 25/016 |
| | | | 340/539.13 |
| 2010/0099461 A1* | 4/2010 | Rahfaldt | H04M 1/72424 |
| | | | 455/557 |
| 2011/0215921 A1 | 9/2011 | Ben Ayed et al. | |
| 2012/0045058 A1 | 2/2012 | Weghaus | |
| 2014/0274013 A1 | 9/2014 | Santavicca | |
| 2014/0370879 A1* | 12/2014 | Redding | H04M 3/42178 |
| | | | 455/419 |
| 2015/0148989 A1 | 5/2015 | Cooper et al. | |
| 2015/0161832 A1 | 6/2015 | Esselink et al. | |
| 2015/0310681 A1 | 10/2015 | Avery et al. | |
| 2015/0356797 A1 | 12/2015 | McBride et al. | |
| 2016/0150407 A1 | 5/2016 | Michaud et al. | |
| 2017/0005958 A1* | 1/2017 | Frenkel | H04L 51/046 |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0148306 A1* | 5/2017 | Wolfson | H04W 4/33 |
| 2017/0251347 A1* | 8/2017 | Mehta | H04W 4/90 |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2019/0145648 A1* | 5/2019 | Sinha | G08B 7/066 |
| | | | 219/482 |
| 2020/0106877 A1* | 4/2020 | Ledvina | H04M 1/72436 |
| 2020/0374682 A1* | 11/2020 | Newman | H04L 63/108 |
| 2021/0012627 A1* | 1/2021 | Coles | G08B 25/016 |

FOREIGN PATENT DOCUMENTS

| | | |
|---|---|---|
| WO | WO-16156682 A1 | 10/2016 |
| WO | WO-2017181050 A1 | 10/2017 |
| WO | WO-18040641 A1 | 3/2018 |

\* cited by examiner

UWB AND BLE BASED INCIDENT REPORTING AND PREVENTING SYSTEM IMPLEMENTED USING MOBILE ACCESS DEVICES

FIELD

The present disclosure relates to crime reporting systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Crimes occur in various areas including areas where there is typically low cellular signal coverage, such as in a subway, a tunnel, or a parking garage. For example, incidents including inappropriate and/or unwelcome touching and/or contact of a victim by an attacker occur in these areas. Other incidents include people illegally urinating on walls and/or in public spaces and/or expose private body parts. As yet another example, in certain areas fights between people occur, where one or more individuals are injured. In some settings it can be uncomfortable to report such criminal behavior. It can also be difficult to identify the person or persons performing the crime.

SUMMARY

A mobile access device is provided and includes a memory, a transceiver and a control module. The memory is configured to store incident information. The transceiver is configured to report the incident information to a relay station. The transceiver is at least one of ultra-wideband enabled or personal area network enabled. The control module is configured to: execute an emergency alerting application; transmit an alert signal from the mobile access device to the relay station indicating an incident has occurred; collect the incident information including at least one of (i) capturing audio or video of the incident, or (ii) receiving a descriptive comments from a user of the mobile access device; generate a report message including the incident information; and perform countermeasures including sending the report message to the relay station. At least one of the alert signal or the report message includes a unique signal identifier.

In other features, the unique signal identifier is an ultra-wideband signal identifier or a Bluetooth® low energy signal identifier.

In other features, the transceiver is ultra-wideband enabled and Bluetooth® enabled.

In other features, the transceiver is personal area network enabled and transmits signals at 2.4 GHz.

In other features, the control module is configured to aid in determining a location of the mobile access device by performing an ultra-wideband or Bluetooth® signal exchange with the relay station.

In other features, the control module is configured to determine distances between the mobile access device and nearby objects and report the distances to the relay station.

In other features, the control module is configured to receive the descriptive comments as an input from the user of the mobile access device and transmit the descriptive comments to the relay station via an ultra-wideband signal.

In other features, a relay station is provided and includes a memory, a transceiver and a control module. The memory is configured to store incident information. The transceiver is configured to receive the incident information from first mobile access devices and report the incident information to at least one of a central monitoring station or an emergency responding station. The transceiver is at least one of ultra-wideband enabled or personal area network enabled. The control module is configured to: identify the first mobile access devices based on unique signal identifiers of signals received from the first mobile access devices; determine locations of the first mobile access devices; combine the identities and locations of the first mobile access devices with the received incident information to generate a report; and perform a countermeasure including transmitting, via the transceiver, the report to the at least one of the central monitoring station or an emergency responding station.

In other features, the control module is configured to determine locations of the first mobile access devices using ultra-wideband signal transmission.

In other features, the control module is configured to determine locations of the relay station and objects nearby using Bluetooth signal transmission.

In other features, the control module is configured to: identify at least one of owners or users of the first mobile access devices based on the identities of the first mobile access devices; and include the identities of the at least one of the owners or users of the first mobile access devices in the report.

In other features, the control module is configured to: identify and determine locations of second mobile access devices, where the second mobile access devices are at least one of (i) not reporting incident information, or (ii) not transmitting an alert signal associated with the incident; identify at least one of owners or users of the second mobile access devices based on the identities of the second mobile access devices; and include the identities of the at least one of the owners or users of the second mobile access devices in the report.

In other features, the control module is configured to: receive alert signals from the first mobile access devices, where the alert signals indicate an incident has occurred; prior to receiving the alert signals, determine locations of the first mobile access devices via Bluetooth® signal transmission to generate first location data; in response to receiving the alert signal, enable ultra-wideband signal transmission; determine locations of the first mobile access devices using ultra-wideband signal transmission to generate second location data; and report the first location data and the second location data to the at least one of the central monitoring station or an emergency responding station.

In other features, the control module is configured to actuate one or more controlled devices based on the incident information.

In other features, the control module is configured to: request additional incident information from the first mobile access devices; receive the additional incident information from the first mobile access devices; and report the additional incident information to the at least one of the central monitoring station or an emergency responding station.

In other features, a system is provided and includes: the relay station and antenna modules. The antenna modules are connected to the relay station and at remote locations away from the relay station. The antenna modules are configured to collect additional incident information and transmit the additional incident information back to the relay station.

In other features, a station is provided and includes a memory, a transceiver and a control module. The memory is configured to store incident information. The transceiver is configured to receive the incident information from 5G enabled towers and report the incident information to first responders via an emergency responding station. The control module is configured to: receive alert signals from the 5G enabled towers, where the alert signals indicate that an incident has occurred, where the alert signal indicate that the incident is being reported by first mobile access devices; analyze the incident information and determine locations of the first mobile access devices, where the incident information includes micro-location ultra-wideband based data; identify at least one of owners or users of the first mobile access devices based on the incident information; and inform the first responders the locations of the first mobile access devices and identities of the at least one of the owners or users of the first mobile access devices.

In other features, the control module is configured to: analyze the incident information and determine locations of second mobile access devices, where the incident information includes additional micro-location ultra-wideband based data; identify at least one of owners or users of the second mobile access devices based on the incident information; and inform the first responders the locations of the second mobile access devices and the identities of at least one of the owners or users of the second mobile access devices.

In other features, the incident information includes Bluetooth location data indicating estimated locations of the first mobile access devices. The control module is configured to inform the first responders the estimated locations of the first mobile access devices.

In other features, the control module is configured to: request additional incident information from the 5G towers; receive the additional incident information from the 5G towers; and report the additional incident information to the first responders.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Crimes occur in various locations and often go unreported due to: circumstances of the incident; people involved; difficulty in identifying the person or persons performing the criminal acts; threats made; poor visibility; the willingness of the victim to report the incident; etc. These crimes can often occur in areas where there is low cellular signal coverage, low visibility, and/or high levels of noise. The crimes can occur in highly crowded areas or in areas where the only people around are the attacker and the victim.

The examples set forth herein include incident reporting and preventing systems that allow victims and/or helpful persons (often referred to as a "good Samaritans") to capture and report incidents and as a result prevent further incidents. This may be done silently without the assailant and/or criminal being aware of the reporting. This allows multiple people that are witness to an incident to record audio and/or video of the incident and report the incident immediately and in a semi-anonymous and/or passive aggressive manner. A report message may be sent including the audio, video and/or witness comments. Each witness is able to report the incident without other witnesses and/or people in the area knowing that the reporting has occurred.

The reporting of incidents may occur in legacy low coverage areas (i.e. areas traditionally not supporting the fifth generation technology standard for cellular networks (5G) ultra wideband (UWB) coverage), such as in subways, tunnels, parking garages, elevators, stairwells, etc. The witnesses of an incident are able to report the incident using mobile access devices (e.g., cellular phones, tablets, wearable devices, etc.) that are 5G UWB and Bluetooth® low energy (BLE) enabled and operating in a 5G network. The systems disclosed herein include a 5G UWB and BLE network capable of receiving reporting messages from mobile access devices and forwarding the messages to a central monitoring office and/or first responder emergency stations to allow for quick tracking and response. The network and/or mobile access devices are able to receive, collect, retrieve, and/or report unique signal identifiers (IDs) and specific micro-location data of the mobile access devices of the assailant, criminal, victim and witnesses. This information may be collected without the assailant, criminal, victim and witnesses being aware of the information being collected or alternatively, as in one example, the witnesses are alerted of at least some of the information collected. This allows for quick identification of the assailant, criminal, victim and witnesses and quick effective dispatching of first responders to the area of interest.

Figure 1:
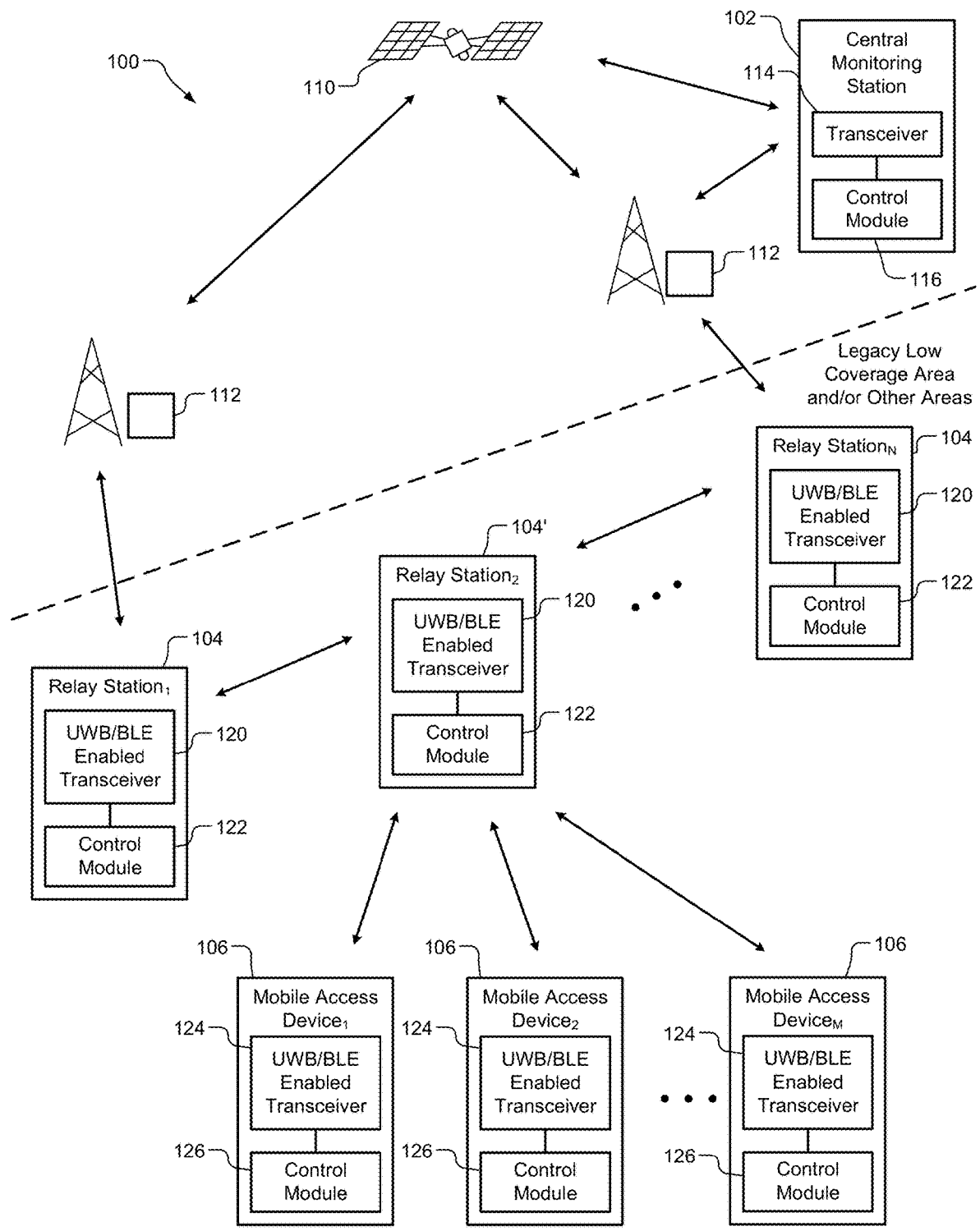
FIG. 1 is a functional block diagram of an example of a first portion of an incident reporting and preventing system including a central monitoring station, relay stations and mobile access devices in accordance with the present disclosure.

FIG. 1 shows a first portion 100 of an incident reporting and preventing system (also referred to as a "crime and emergency reporting and preventing system") that includes a central monitoring station 102, relay stations 104 and mobile access devices 106. The relay stations 104 and the mobile access devices 106 may be located in a legacy low coverage area and/or in other areas. Any number of relay stations and mobile access devices may be included in the incident reporting and preventing system 100. The incident reporting and preventing system may further include one or more satellites (one satellite 110 is shown), and one or more base stations (two base stations 112 are shown). The mobile access devices 106 may be owned and/or used by witnesses, an assailant, a victim, a criminal and/or other nearby people (e.g., non-witnesses and/or non-victims) of an incident. The mobile access devices 106 may capture incident data and report the incident data to one or more nearby relay stations (e.g., the relay station 104'), which may then relay the data between the relay stations 104 and send the data to the central monitoring station 102. This may occur via the satellite 110 and/or base stations 112. The reporting may occur from mobile access devices without the owners and/or users of the mobile access devices being aware of the reporting.

The central monitoring station 102 may include a transceiver 114 and a control module 116. The relay stations 104 may each include a UWB and/or BLE enabled transceiver 120 and a control module 122. Each of the relay stations 104 may be UWB enabled, BLE enabled or both UWB and BLE enabled and capable of transmitting and/or receiving 5G UWB and/or BLE signals. The mobile access devices 106 may each include a UWB and/or BLE enabled transceiver 124 and a control module 126. In one embodiment, at least some of the relay stations 104 operate as 5G towers that are both BLE and UWB enabled. The relay stations 104 may operate as beacons sending out BLE and/or UWB signals to establish connections with nearby devices. Micro-location data indicating locations of mobile access devices is generated and reported to the central monitoring station 102 and/or to emergency responding stations and first responder devices as further described below. In an embodiment, the BLE enabled relay stations continuously monitor what mobile access devices are in local areas and provide rough estimates of the locations of the mobile access devices. The relay stations are further able to, for example when an emergency or incident is reported, enable UWB operations to provide micro-location data of the mobile access devices. This includes providing precise locations of the mobile access devices, which may be accomplished using triangulation techniques. The micro-location data, as an example, may be accurate within ±10 cm.

The mobile access devices 106 may include cellular phones, wearable devices, tablets, laptop computers, and/or other portable network devices. The mobile access devices 106 may each be, for example, a Bluetooth®-enabled and UWB-enabled communication device, such as a smart phone, smart watch, wearable electronic device, key fob, tablet device, or other device associated with a user. The user may be an owner and/or authorized user of the mobile access device.

The relay stations 104 and the mobile access devices 106 may communicate using UWB frequencies (e.g., 3.1-10.6 Giga-Hertz (GHz)), the BLE 2.4 GHz frequency, wireless fidelity (Wi-Fi®) frequencies, and/or other suitable radio frequency (RF) frequencies. As an example, the UWB signals may be spread over a large bandwidth of greater than 500 Mega-Hertz (MHz). The BLE and/or UWB signals may be transmitted to and/or received from the mobile access devices 106 and used to connect with and track a location and movement of the mobile access devices 106.

Figure 2:
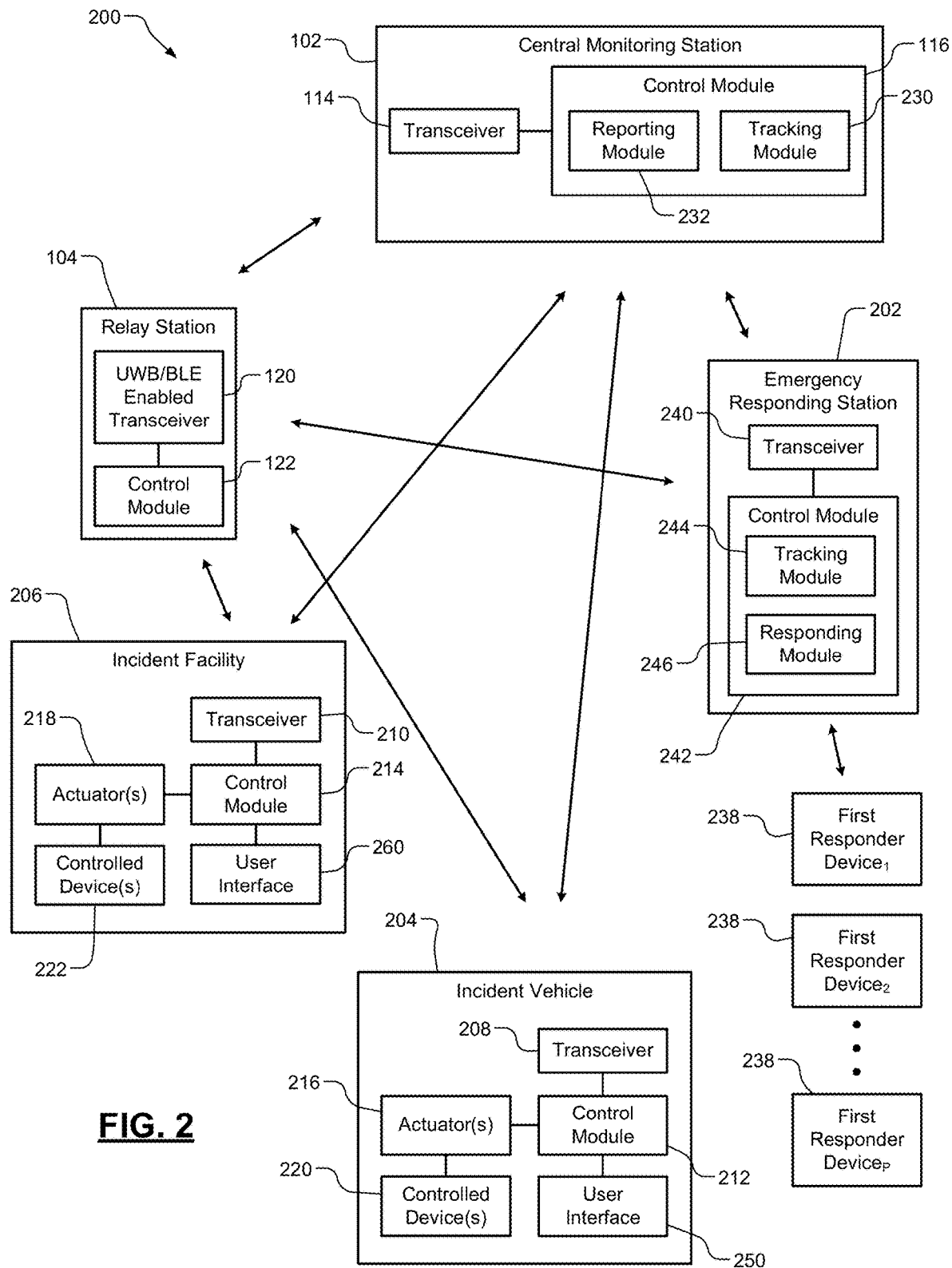
FIG. 2 is a functional block diagram of an example of a second portion of the incident reporting and preventing system of FIG. 1 further illustrating an emergency responding station, an incident vehicle, an incident facility, and first responder devices in accordance with the present disclosure.

FIG. 2 shows a second portion 200 of the incident reporting and preventing system further illustrating the central monitoring station 102, the relay station 104, an emergency responding station 202, an incident vehicle 204 and an incident facility 206. The incident vehicle 204 and the incident facility 206 may each include one or more relay stations, such as the relay stations 104 or may operate as relay stations have respective transceivers 208, 210 control modules 212, 214 actuators 216, 218 and controlled devices 220, 222. The incident vehicle 204, the incident facility 206 and the relay station 104 may report incident information to the central monitoring station 102, which may then communicate with the emergency responding station 202. The incident vehicle 204, the incident facility 206 and the relay station 104 may communicate with the emergency responding station 202 directly. Incident information may include, for example, unique signal IDs of mobile access devices, locations of mobile access devices, IDs of mobile access devices, contact and/or address information of owners and/or users of mobile access devices, information regarding the incident, etc. The signal IDs may include UWB signal IDs, BLE signal IDs, and/or other signal IDs of signals transmitted by the mobile access devices. The information regarding the incident may include audio or video captured at the scene of the incident, descriptive comments from witnesses, acts performed by the assailant and/or criminal, etc.

The central monitoring station 102 includes the transceiver 114 and the control module 116. The control module 116 includes a tracking module 230 and a reporting module 232. The tracking module 230 may collect, track and store incident information. The tracking module 230 may request additional incident information from mobile access devices in proximity of the incident. This may include the mobile access devices reporting incident information and other mobile access devices nearby that have not yet reported incident related information. The reporting module 232 may report the incident and collected incident information to, for example the emergency responding station 202 and/or other emergency responding stations.

The emergency responding station 202 may be a station at a police station, a fire station, a hospital (or medical facility), and/or other emergency center. The emergency responding station 202 may alert first responder devices 238 of first responders, such as police officers, security contractors, fire fighters, emergency medical technicians (EMTs), paramedics and/or other first responders to proceed to the area of the incident. The emergency responding station 202 may include a transceiver 240 and a control module 242 with a tracking module 244 and a responding module 246. The tracking module 244 may collect and track incident information and the responding module 246 may respond to the incident information by alerting and communicating with first responder devices 238 (e.g., cellular phones, alert systems, walkie-talkies, land-based dispatch systems, etc.).

The relay station 104 includes the UWB and/or BLE enabled transceiver 120 and the control module 122. The relay station 104 may receive information from mobile access devices, the incident vehicle 204 and/or the incident facility 206 and convey that information to the central monitoring station 102 and/or emergency responding station 202. One or more of the relay stations 104 may be located in and/or nearby an indoor or outdoor area where an incident occurs.

The incident vehicle 204 may be a subway car, a train car, an automobile, an aircraft, a watercraft, etc. The transceiver 208 may communicate with one or more mobile access devices, one or more relay stations 104, the central monitoring station 102 and/or the emergency responding station 202. The control module 212 may perform countermeasures in response to detecting an incident and/or receiving incident information from the mobile access devices. Incident information may be inputted via a user interface 250 and/or a vehicle occupant may provide input via the user interface 250 for selected actions to be taken in response to the incident. The user interface 250 may be a microphone, a keypad, a touchscreen, an emergency button, or other input device. The control module 212 may control the actuators 216 to operate the controlled devices 220 based on the incident information and/or the received inputs. The actuators 216 may include motors, links, gears, etc. The controlled devices 220 may include windows, door locks, seat belts, horns, lights, etc.

The incident facility 206 may be a place of business, a subway station, a train station, a bus station, a parking garage, an airport building, a residential home, a hotel, a restaurant, a bar, etc. The transceiver 210 may communicate with one or more mobile access devices, one or more relay stations 104, the central monitoring station 102 and/or the emergency responding station 202. The control module 214 may perform countermeasures in response to detecting an incident and/or receiving incident information from the mobile access devices. Incident information may be inputted via a user interface 260 and/or a facility person, an attendant, or other individual may provide input via a user interface 260 for selected actions to be taken in response to the incident. The user interface 260 may be a microphone, a keypad, a touchscreen, an emergency button, or other input device. The control module 214 may control the actuators 218 to operate the controlled devices 222 based on the incident information and/or the received inputs.

The actuators 216, 218 may be, for example, motors and have corresponding links, connecting members, gears, rollers, etc. for unlocking and/or moving the controlled devices 220, 222. The controlled devices 220, 222 may include one or more locks, gates, hinges, bars, doors, windows, alarms, lights, movable barriers, etc. As an example, the controlled devices 220, 222 may include the gates and the actuators 216, 218 may include motors for unlocking and/or pivoting the gates.

Figure 3:
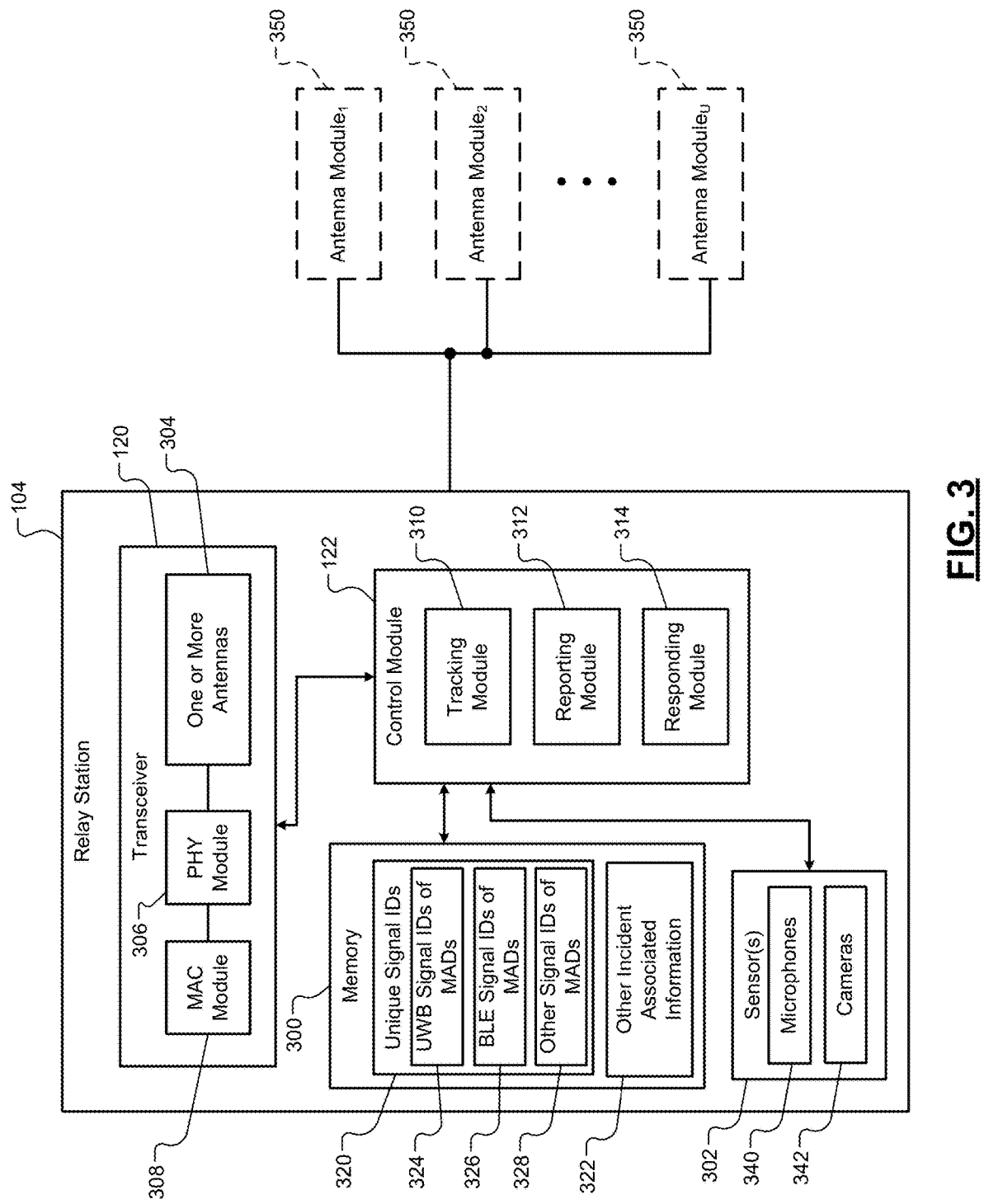
FIG. 3 is a functional block diagram of an example of one of the relay stations of FIG. 1.

FIG. 3 shows an example of one of the relay stations 104 of FIGS. 1-2. The relay station 104 includes the transceiver 120, the control module 122, a memory 300 and sensors 302. The transceiver 120 may include one or more antennas 304 configured for transmitting 5G UWB, BLE and/or other RF signals. The transceiver 120 may further include a PHY module 306 and a medium access control (MAC) module 308.

The control module 122 may include a tracking module 310, a reporting module 312, and a responding module 314. The tracking module 310 may collect, track and store incident information. The tracking module 310 may request additional incident information from mobile access devices in proximity of the incident. This may include mobile access device reporting incident information and other mobile access devices nearby. The reporting module 312 may report the incident and collected incident information to, for example other relay stations 104, the central monitoring station 102, the base stations 112, the emergency responding station 202 of FIGS. 1-2 and/or other emergency responding stations. The responding module 314 may perform countermeasures in response to detecting and/or being informed of an incident. This may include controlling actuators as described above to, for example, stop an incident from continuing, prevent another incident, separate a victim and an assailant or criminal, separate an assailant or criminal from other people, hold an assailant or criminal in a certain area until first responders arrive, etc.

The memory 300 may store unique signal IDs 320 and other incident associated information 322. The unique signal IDs 320 may include UWB signal IDs 324, BLE signal IDs 326, and/or other signal IDs 328. Each of the unique signal IDs 320 may include or refer to a unique signal signature (e.g., frequency, duty cycle, amplitudes, phase, etc.) and/or an identifier provided and inserted in the signal by a transceiver when transmitting the corresponding signal. The identifier may be a predetermined series of bits, which may be encrypted. As an example, each UWB signal transmitted from each mobile access device in a local area may have a unique UWB signal ID, which distinguishes the UWB signals transmitted from that mobile access device from signals transmitted from other mobile access devices. The unique UWB signal ID may be used to identify the mobile access device and as a result determine the owner and/or user of the mobile access device. The other incident associated information 322 may include any of the incident information referred to herein including audio and video captured by the relay station, audio and video captured by mobile access devices in the area, reporting messages from mobile access devices, etc. The memory 300 may include a non-transitory computer-readable medium including read-only memory (ROM) and/or random-access memory (RAM).

The sensors 302 may include microphones 340 and cameras 342 for recording audio and video of a local scene. The microphones and cameras may be located at the relay station 104 or at various locations nearby the relay station 104.

In one embodiment, the relay station 104 including the transceiver 120 and/or the control module 122 transmits signals to, receives signals from, is connected to, and/or wirelessly communicates with antenna modules 350. The antenna modules 350 may be located at various locations, for example, in a facility and used to communicate with and/or monitor locations of mobile access devices. The antenna modules 350 may transmit and receive high-frequency RF signals and may include RF, BLE and/or UWB antennas. The antenna modules 350 may communicate according to Bluetooth®, UWB and/or Wi-Fi® protocols. Each of the antenna modules 350 may include a RF, BLE and/or UWB antenna and may include a control module and/or other circuitry for RF, BLE and/or UWB signal transmission.

The control module 122 and/or the antenna modules 350 may measure a received signal strength of a signal received from a mobile access device and generate a corresponding RSSI value. Additionally or alternatively, the control module 122 and/or the antenna modules 350 may take other measurements of transmitted and received signals from the mobile access device, such as an angle of arrival, a time of flight, a time of arrival, a time difference of arrival, etc. As an example, time of flight calculations may be made to measure time of flight of UWB signals. The control module 122 and/or the antenna modules 350, based on the measured information, may then determine (i) a location of the mobile access device relative to one or more reference points, relay stations, antenna modules, etc. This information may be shared with the control modules 116, 244 of FIGS. 1-2 and/or other station control modules.

The location and distance determinations may be based on similar information received from one or more of the antenna modules 350 and/or other sensors. As an example, the control module 122 and/or the antenna modules 350 may determine the location of the mobile access device based on, for example, patterns of received signal strength indicator (RSSI) values corresponding to signals received from the mobile access device by the antenna modules 350. A strong (or high) RSSI value indicates that the mobile access device is close to a certain point (or location) of interest and a weak (or low) RSSI value indicates that the mobile access device is further away from the point of interest. By analyzing the RSSI values, the control module 122 and/or the antenna modules 350 may determine a location of and/or a distance to the mobile access device relative to the point of interest. Additionally or alternatively, angle of arrival, angle of departure, round trip timing, unmodulated carrier tone exchange, or time difference of arrival measurements for the signals sent between the mobile access device and the control module 122 may also be used by the control module 122 or the mobile access device to determine the location of the mobile access device. The antenna modules 350 may determine the location of and/or distance to the mobile access device based on the measured information and communicate the location or distance to the control module 122. Based on the determined location of or distance to the mobile access device relative to the point of interest, the control module 122 may then authorize and/or perform an action, such as permitting passage through an entryway. Similar operations may be performed for any mobile access device in a nearby area of an incident.

Figure 4:
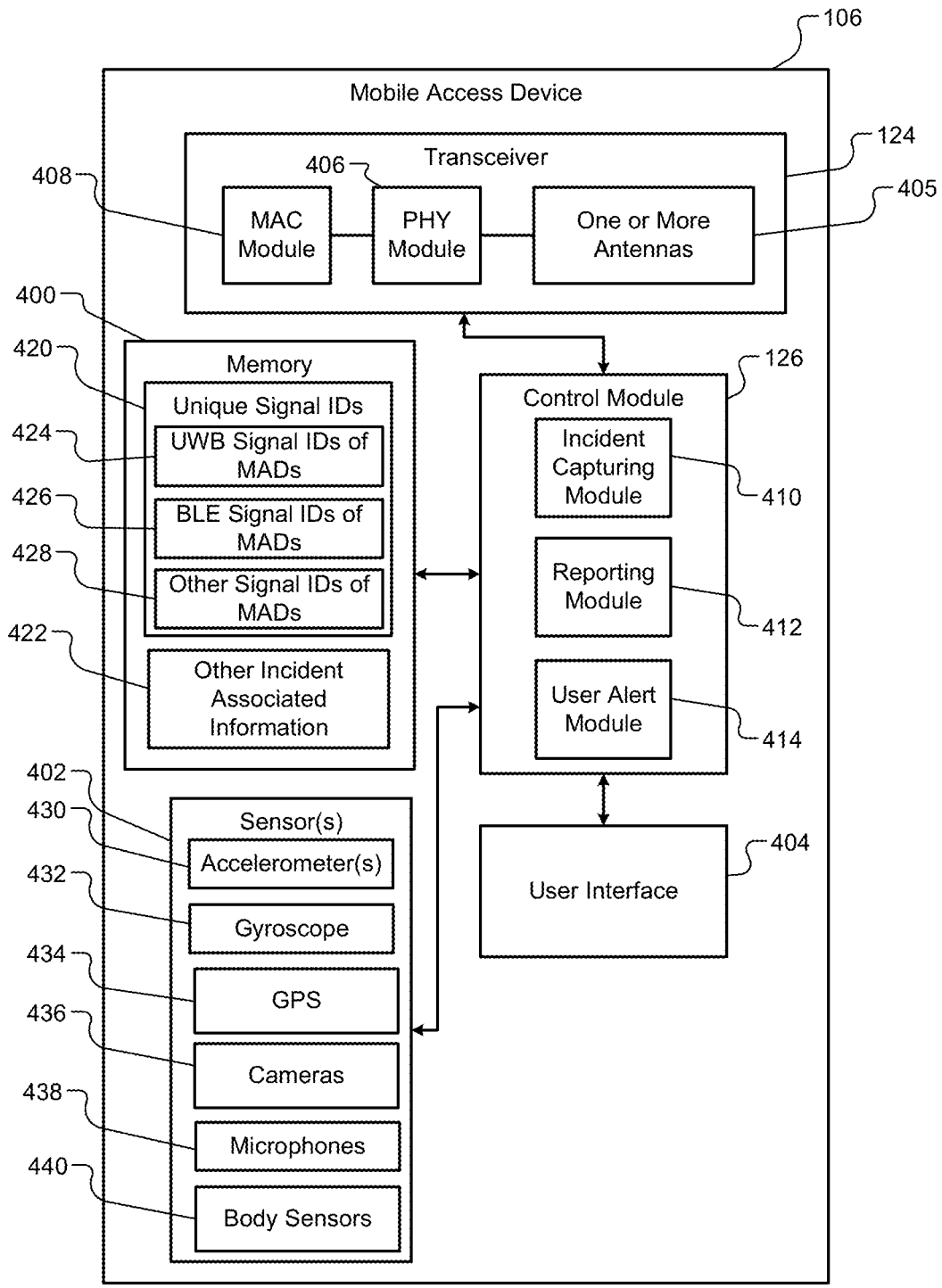
FIG. 4 is a functional block diagram of an example of one of the mobile access devices of FIG. 1.

FIG. 4 shows a mobile access device 106 (one of the mobile access devices of FIG. 1) that includes the transceiver 124, the control module 126, a memory 400, sensors 402 and a user interface 404. The transceiver 124 may include one or more antennas 405 configured for transmitting 5G UWB, BLE and/or other RF signals. The transceiver 124 may further include a PHY module 406 and a medium access control (MAC) module 408.

The control module 126 controls operation of the mobile access device 106. The control module 126 may include an incident capturing module 410, a reporting module 412, and a user alert module 414. The incident capturing module 410 may collect, track and store incident information. The incident capturing module 410 may capture incident information including audio, video, and other information provided by the user of the mobile access device 106. The reporting module 412 may report the incident and collected incident information to, for example one or more of the relay stations 104 of FIGS. 1-2 and/or antenna modules of the relay stations.

The user alert module 414 may perform countermeasures in response to detecting and/or being informed of an incident. This may include alerting the user of the mobile access device 106 to take certain actions, such as to move away from the incident area, remain calm, remain silent, hide, move such that a barrier is between the user and the assailant and/or criminal, set off a loud audible alarm to scare off the assailant and/or criminal, signal other nearby mobile access devices to also set off a loud audible alarm, etc.

The memory 400 may store unique signal IDs 420 and other incident associated information 422. The unique signal IDs 420 may include UWB signal IDs 424, BLE signal IDs 426, and/or other signal IDs 428. Each of the unique signal IDs 420 may include or refer to a unique signal signature (e.g., frequency, duty cycle, amplitudes, phase, etc.) and/or an identifier provided and inserted in the signal by a transceiver when transmitting the corresponding signal. The other incident associated information 422 may include any of the incident information referred to herein including audio and video captured by the relay station, audio and video captured by mobile access devices in the area, reporting messages from mobile access devices, etc. The memory 400 may include a non-transitory computer-readable medium including read-only memory (ROM) and/or random-access memory (RAM).

The sensors 302 may include microphones 340 and cameras 342 for recording audio and video of a local scene. The microphones and cameras may be located at the relay station 104 or at various locations nearby the relay station 104.

The location of a mobile access device 106 may be determined using any of the sensors 402. The control module 126 may transmit information regarding the mobile access device 106, such as location, heading and/or velocity information obtained from one or more of the sensors 402 to one or more of the relay stations 104 of FIGS. 1-2. In the example shown, the sensors 402 include one or more accelerometers 430, a gyroscope 432, a global position system (GPS) 434, cameras 436, microphones 438, body sensors 440, and/or other sensors (e.g., angular rate sensors). Single sided ranging, double sided ranging, time-of-flight determining, round trip time determining, etc. may be performed to determine distances between the mobile access device 106 and reference points, relay stations, antenna modules, etc. Incident information may be captured via the cameras 436, microphones 438, and/or user interface 404. The user interface 404 may include a microphone, a display, a touchscreen, a touch pad, a keyboard, etc.

The body sensors 440 may include, for example, a heart rate sensor, a blood pressure sensor, respiration sensor, temperature sensor, etc. In one embodiment, body status information gathered using these sensors is provided when reporting the incident in order to gather more information regarding the status of the user of the corresponding mobile access device.

Figure 5:
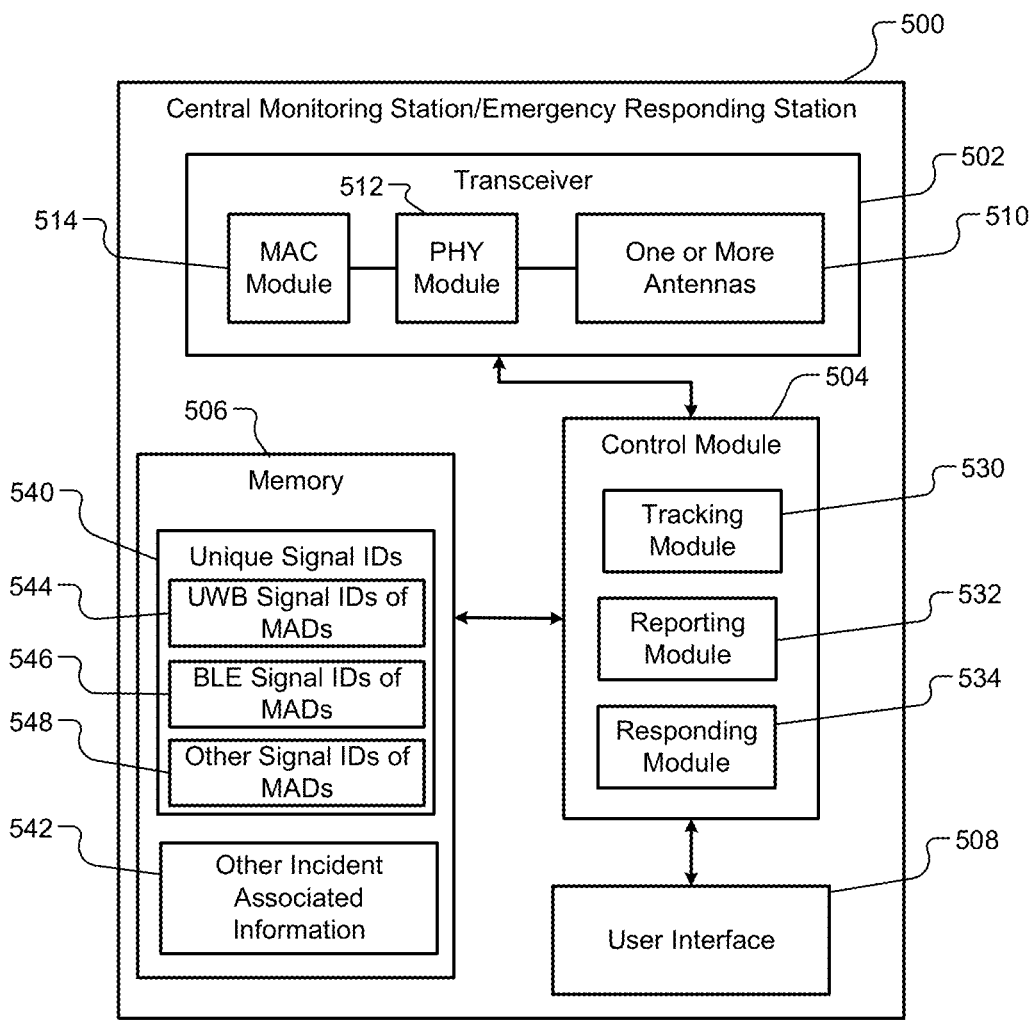
FIG. 5 is a functional block diagram of an example of the central monitoring station and/or the emergency responding station of FIGS. 1-2.

FIG. 5 shows an example of a central monitoring station and/or emergency responding station, referred to as the station 500. The central monitoring station 102 of FIG. 2 and/or the emergency responding station 202 of FIG. 2 may be configured as the station 500. The station 500 may include a transceiver 502, the control module 504, a memory 506 and a user interface 508. The transceiver 502 may include one or more antennas 510 configured for transmitting 5G UWB, BLE and/or other RF signals. The transceiver 502 may further include a PHY module 512 and a medium access control (MAC) module 514.

The control module 504 may include a tracking module 530, a reporting module 532, and a responding module 534. The tracking module 530 may collect, track and store incident information. The tracking module 530 may request additional incident information from relay stations in proximity of the incident. The requests may be directed to the relay stations and/or mobile access devices in communication with the relay stations. This may include requesting information from other mobile access devices nearby that have not yet provided incident information.

The reporting module 532 may report the incident and collected incident information to, for example other relay stations, a central monitoring station, emergency responding stations, etc. The responding module 534 may perform countermeasures in response to detecting and/or being informed of an incident. This may include remotely controlling actuators as described above to, for example, stop an incident from continuing, prevent another incident, separate a victim and an assailant or criminal, separate an assailant or criminal from other people, alert mobile access devices of others nearby (not including the assailant and/or criminal), hold an assailant or criminal in a certain area until first responders arrive, etc.

The memory 506 may store unique signal IDs 540 and other incident associated information 542. The unique signal IDs 540 may include UWB signal IDs 544, BLE signal IDs 546, and/or other signal IDs 548, which may include and of the above-stated unique signal IDs. Each of the unique signal IDs 320 may include or refer to a unique signal signature (e.g., frequency, duty cycle, amplitudes, phase, etc.) and/or an identifier provided and inserted in the signal by a transceiver when transmitting the corresponding signal. The other incident associated information 542 may include any of the incident information referred to herein including audio and video captured by the relay station, audio and video captured by relay stations, antenna modules and/or mobile access devices in the area, reporting messages from mobile access devices, etc. The memory 506 may include a non-transitory computer-readable medium including read-only memory (ROM) and/or random-access memory (RAM). The user interface 508 may include a microphone, a display, a touchscreen, a touch pad, a keyboard, etc.

Figure 6:
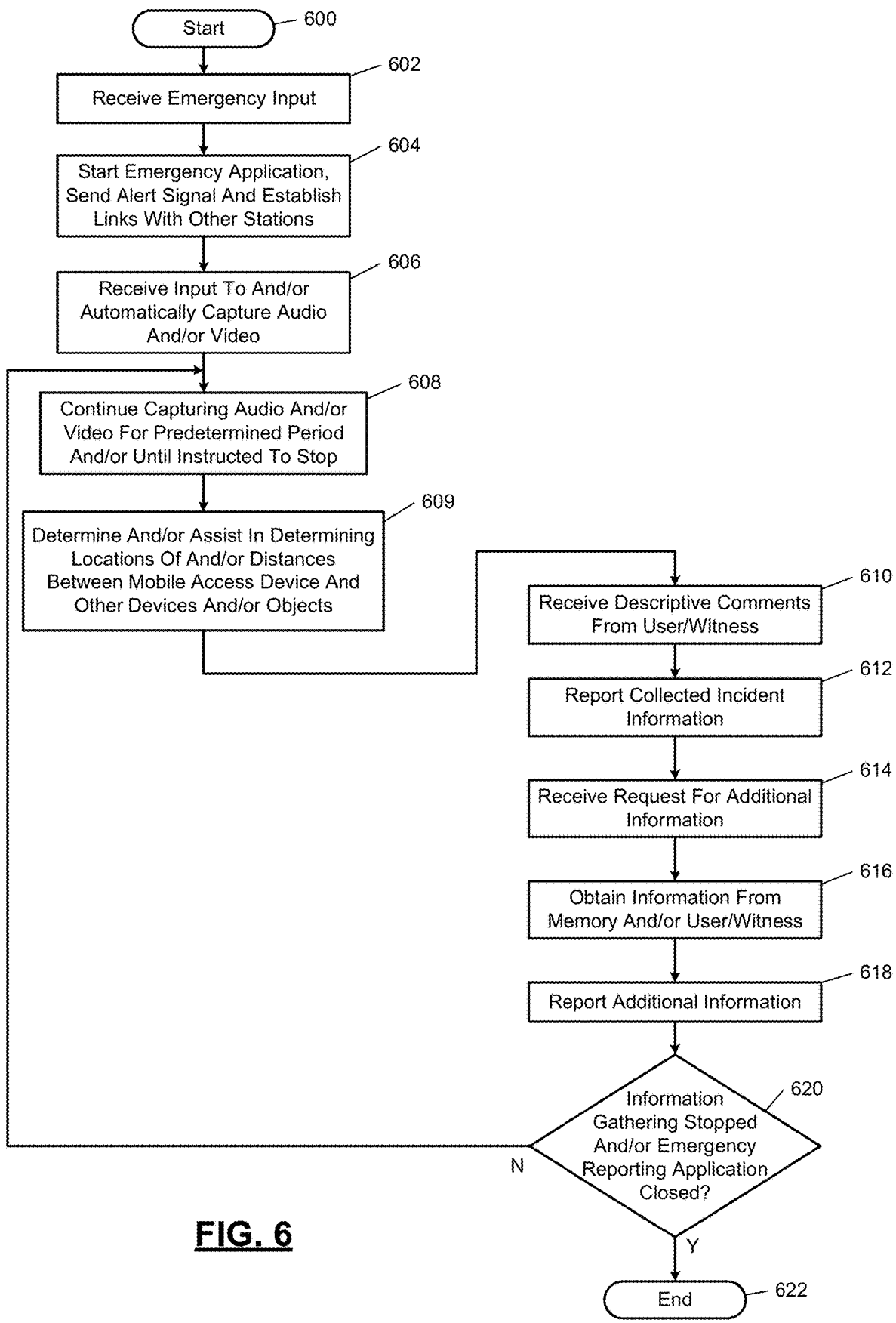
FIG. 6 illustrates an example method of operating a mobile access device in accordance with the present disclosure.
Figure 7:
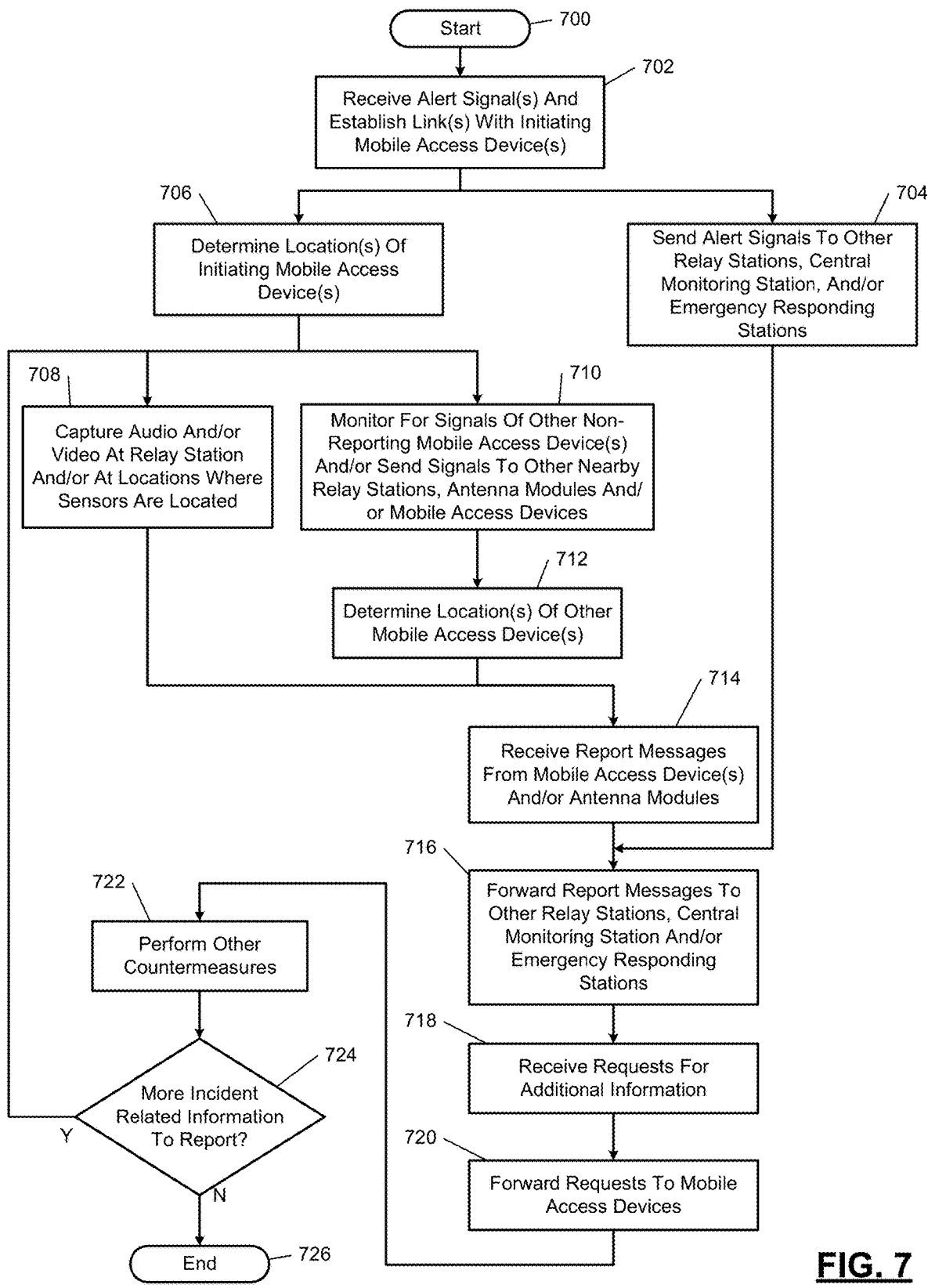
FIG. 7 illustrates an example method of operating a relay station in accordance with the present disclosure.
Figure 8:
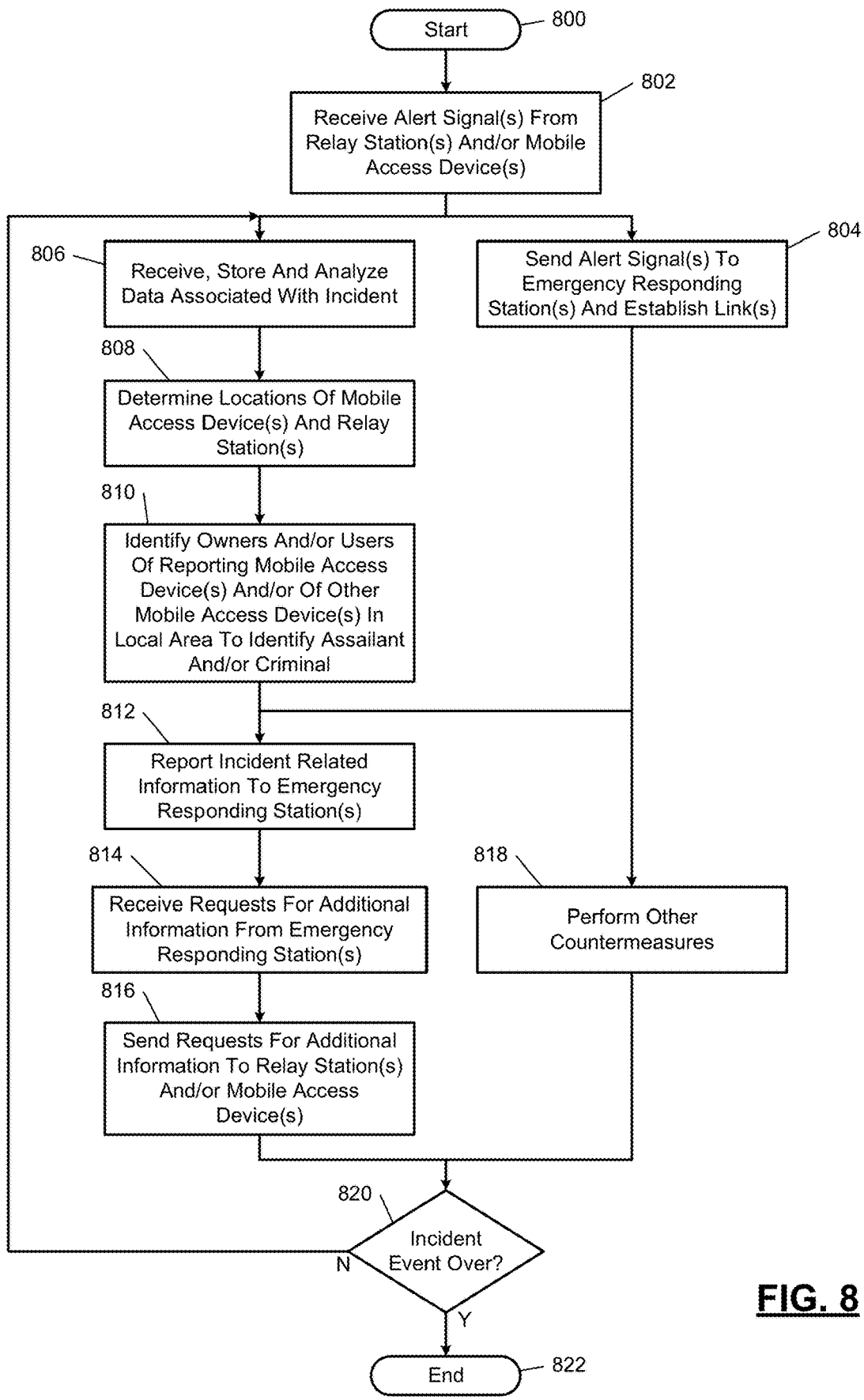
FIG. 8 illustrates an example method of operating a central monitoring station in accordance with the present disclosure.
Figure 9:
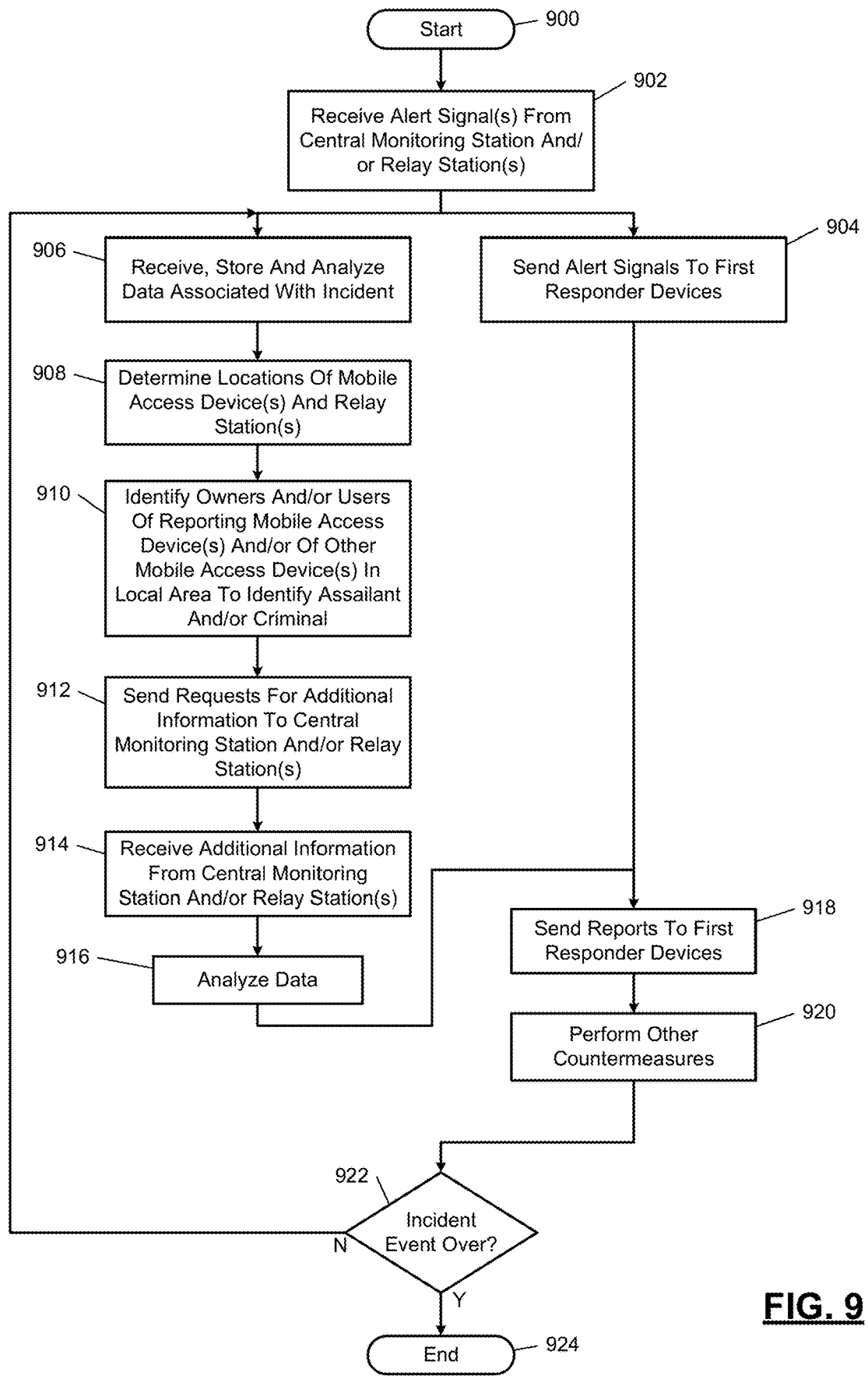
FIG. 9 illustrates an example method of operating an emergency responding station in accordance with the present disclosure.

FIG. 6 illustrates a method of operating a mobile access device. Although the following operations of FIGS. 6-9 are primarily described with respect to the implementations of FIGS. 1-5, the operations may be easily modified to apply to other implementations of the present disclosure. The operations may be iteratively performed and/or performed in a different order. Each of the operations may be performed while one or more of the other operations are being performed. The method of FIG. 6 may be performed while the methods of FIGS. 7-9 are being performed. The operations of FIG. 6 may be performed by a control module of a mobile access device (e.g., one of the control modules 126 of one of the mobile access devices 106 of FIG. 1).

The method may begin at 600. At 602, the control module receives an emergency input from a user of the mobile access device. The user may witness an incident occurring and act as a good Samaritan and report the incident. As an example, the mobile access device may have: one or more buttons and/or icons to depress and/or tap on; a combination thereof; and/or a sequence, pattern and/or number of clicks of buttons and/or icons, to initiate an emergency alerting application. The control module may execute the emergency alerting application to establish links with other devices including relay stations and/or a central monitoring station. The links may be BLE and/or UWB links.

At 604, the control module, in response to receiving the input at 602, may start the emergency alerting application, send an alert signal to a relay station, a central monitoring station, and/or other station and establish links with the stations. The alert signal may indicate that an incident has occurred and/or is occurring and include unique signal IDs as described above.

At 606, the control module while executing the emergency alerting application may receive an input to and/or automatically begin capturing audio and video. This is done to record the incident event for determining people at the scene, acts performed by the people at the scene, timing of events, what people said at the time of the event, etc.

At 608, the control module may continue to capture audio and video for a predetermined period of time and/or until being instructed to stop. The user may move the camera of the mobile access device to show the surroundings or video may simply be captured without the user pointing the mobile access device 106 in any particular direction to simply capture any information possible.

At 609, the control module may determine and/or assist a relay station in determining a location of the mobile access device. This may include transmitting and receiving BLE and/or ultra-wideband signals to determine and/or assist in determining locations of and/or distances between the mobile access device and other devices and/or objects in the area.

At 610, the control module via the corresponding user interface receives descriptive comments from the user (or witness). This may include text statements describing: observed acts by people in the area; items heard, seen, felt and/or smelled by the user; and/or other related incident information. At 612, the control module may report the collected incident related information to the stations to which the mobile access device is linked. This may include unique signal IDs as described above and any of the collected and/or determined incident information including the above-stated audio, video, descriptive comments, distances, etc. The reporting may be via BLE signal transmission and/or other RF signal transmission.

At 614, the control module may receive a request for additional information from any of the stations to which the mobile access device is linked. This may be done by one of the stations to gather additional details about the incident and/or specifics about the people in the near and/or part of the incident. At 616, the control module may then retrieve the additional information from memory, if already stored in memory, or display questions to the user. If the user is using ear buds, the questions may be provided in an audio format. The questions may not be provided via a speaker of the mobile access device to avoid others from hearing the questions. At 618, the control module may report the additional information to the stations to which the mobile access device is linked. The report may include the unique signal IDs. The reporting may be via BLE signal transmission and/or other RF signal transmission.

At 620, the control module determines whether information gathering has stopped and/or the emergency reporting application has been closed. If either of these two conditions is TRUE, then the method may end at 622, otherwise operation 608 may be performed.

The identification and authorization information 332 may include user identifiers (IDs), mobile access device IDs, user personal information including account numbers, home addresses, phone numbers, usernames, passwords, etc. At least some of the identification and authorization information 332 may be encrypted to provide identification and authorization information codes, which may also be stored in the memory 300.

FIG. 7 shows a method of operating a relay station. The operations of FIG. 7 may be performed by a control module of a relay station (e.g., one of the control modules 122 of one of the relay stations 104 of FIGS. 1-2).

The method may begin at 700. At 702, the control module may receive alert signals from mobile access devices of an incident (i.e. witness to the incident) and establish links with the mobile access devices. The links may be BLE and/or UWB links. The control module may exchange signals and establish a secure communication link with the mobile access devices. The signals may have unique signal IDs as described above. For example, the control module may be configured to implement challenge-response authentication or other cryptographic verification algorithms in order to authenticate the mobile access device 106. This authentication may be based on the identification and authorization information and/or associated codes. This information may include any of the user identification, mobile access device identification and/or authorization information. The information may include user contact information, user physical address, a username, a password, etc.

At 704, the control module may send alert signals to other relay stations, a central monitoring station, and/or emergency responding stations, such as stations 102, 104 and 202 of FIGS. 1-2. The alert signals may indicate that an incident has occurred and/or is still occurring.

At 706, the control module may activate UWB operations and determine locations of the mobile access devices. This may be done as described above using various techniques. For example, BLE signals may be exchanged to estimate the locations of the mobile access devices, UWB signals may be transmitted and triangulation performed to gather microlocation data, etc. The relay station may determine the location of each of the mobile access devices and/or each mobile access device may determine its location and report the location to the relay station. The locations may be relative to: reference points; locations of relay stations; objects; antenna modules; etc. This may include the control module exchanging signals with the mobile access devices to determine distances between (i) the relay station and/or antenna modules and (ii) the mobile access devices. The signals may have unique signal IDs as described above. The locations of the mobile access devices may be determined using UWB signal transmission between (i) the relay station and/or antenna modules and (ii) the mobile access devices. BLE signal transmission may be used to determine distances between the relay station and/or antenna modules and objects.

At 708, the control module may capture audio and/or video at the relay station and/or at locations where sensors are located.

At 710, the control module may monitor for signals of other non-reporting mobile access devices and/or send signals to other nearby relay stations, antenna modules, and/or mobile access devices. The signals may be UWB and/or BLE signals. The signals of the other non-reporting mobile access devices may have unique signal IDs as described above. This may be done to establish links with other devices in the area and collect additional incident information. At 712, the control module may determine locations of other mobile access devices in a similar manner as describe at 706.

At 714, the control module may receive report messages from mobile access devices and/or antenna modules. The report messages may include the unique signal IDs. The report messages may be via UWB and/or BLE signals.

At 716, the control module may forward the report messages to other relay stations, a central monitoring stations and/or emergency responding stations. The report messages may be sent via non-UWB and non-BLE signals, such as WLAN signals or cellular signals.

At 718, the control module may receive requests for additional information from the central monitoring station and/or emergency responding stations. The requests may be may be sent via non-UWB and non-BLE signals, such as WLAN signals or cellular signals. At 720, the control module may forward some or all of the requests to mobile access devices. This may be via non-UWB and non-BLE signals, such as WLAN signals or cellular signals.

At 722, the control module may perform countermeasures other than reporting incident information. This may include closing and/or opening gates, doors, and/or windows, moving barriers, setting off alarms, etc. At 724, the control module determines if there is more incident related information to report. This may be based on additionally stored incident information and/or recently received incident information. If yes, operations 708 and 710 may be performed, otherwise the method may end at 726.

FIG. 8 shows a method of operating a central monitoring station (e.g., the central monitoring station 102). The operations of FIG. 8 may be performed by a control module of a central monitoring station (e.g., the control module 116 of the central monitoring station 102 of FIGS. 1-2).

The method may begin at 800. At 802, the control module may receive alert signals from relay stations and/or mobile access devices. The communication with the relay stations and/or mobile access devices may be via non-UWB and non-BLE signals, such as WLAN signals or cellular signals.

At 804, the control module may send alert signals to the emergency responding stations. At 806, the control module may receive, store and analyze data associated with the incident. At 808, the control module may determine locations of the mobile access devices and relay stations.

At 810, the control module may identify owners and/or users of reporting mobile access devices and/or of other mobile access devices in a local area to identify one or more assailants and/or one or more criminals. Identifying the witnesses and corresponding mobile access devices, allows the control module to narrow down by process of elimination, which mobile access devices are being used by an assailant and/or criminal. This also allows the control module to reduce the number of possible assailants and/or criminals (or suspects) and identify the assailants and/or criminals and corresponding mobile access devices. Based the number of mobile access devices reporting the incident, an executed algorithm may identify the assailant, criminal and/or victim. This may be based on the unique signal IDs of signals transmitted by the mobile access devices including unique BLE and/or UWB signal IDs.

At 812, the control module may report incident related information to emergency responding stations. At 814, the control module may receive requests for additional information from emergency responding stations. At 816, the control module may send requests for additional information to relay stations and/or mobile access devices.

After operations 804 and/or 810, the control module may at 818 perform other countermeasures. The control module may close and/or open gates, doors and/or windows, move barriers, set off alarms, etc. At 820, the control module may determine whether an incident is over. If yes, the method may end at 822, otherwise operations 804 and 806 may be performed.

FIG. 9 shows a method of operating an emergency responding station. The operations of FIG. 9 may be performed by a control module of an emergency responding station (e.g., the control module 242 of the emergency responding station 202 of FIG. 2).

The method may begin at 900. At 902, the control module may receive alert signals from the relay stations and/or the central monitoring station. At 904, the control module may send alert signals to the first responder devices of first responders, such as police, fire fighters, paramedics, EMTs, etc., as described above.

At 906, the control module may receive, store and analyze data associated with the incident. At 908, the control module may determine locations of the mobile access devices and relay stations.

At 910, the control module may identify owners and/or users of reporting mobile access devices and/or of other mobile access devices in a local area to identify one or more assailants and/or one or more criminals. Identifying the witnesses and corresponding mobile access devices, allows the control module to narrow down by process of elimination, which mobile access devices are being used by an assailant and/or criminal. This also allows the control module to reduce the number of possible suspects and identify the assailants and/or criminals and corresponding mobile access devices. Based the number of mobile access devices reporting the incident, an executed algorithm may identify the assailant, criminal and/or victim. This may be based on the unique signal IDs of signals transmitted by the mobile access devices including unique BLE and/or UWB signal IDs.

At 912, the control module may send request for additional information to central monitoring station and/or relay stations. At 914, the control module may receive additional information from central monitoring station and/or relay stations.

At 916, the control module may analyze received and/or collected incident related information to, for example, identify assailants and/or criminals, victims, witnesses, and/or other people in the local area of the incident.

After operations 904 and/or 916, operation 918 may be performed. At 918, the control module may send reports including incident related information to the first responder devices, such as the first responder devices 238.

At 920, the control module may perform other countermeasures. The control module may close and/or open gates, doors and/or windows, move barriers, set off alarms, etc. At 922, the control module may determine whether the incident event is over. If yes, the method may end at 924, otherwise the method may return to operations 904 and/or 906.

The above-described operations of FIGS. 6-9 are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The above-described examples allow a 5G network including thousands of 5G towers with improved coverage to quickly determine and identify mobile access devices are in a local area. BLE is used for rough location estimates and UWB is used for accurate location determinations. If an emergency occurs, good Samaritans in the area are able to use their 5G enabled mobile access devices to record video of the incident and be located accurately within the BLE/UWB anchor system provided by the 5G towers. Based on the number and orientation of the good Samaritans reporting the incident, people present at the scene of the incident including witnesses, bystanders, assailants, criminals, and victims are able to be identified. Identifiable information of potential suspects near and/or at the vicinity of a crime are better able to be determined based on the collected incident information. By using the stated examples it is possible to determine who is nearby during the time of a crime. Crimes are able to be reported in a passive aggressive manner. Stations and first responder devices are able to identify the criminals and/or suspects of the crime. The stations and first responder devices may take actions for suspect questioning and/or over time monitor repeat occurrences to narrow the list of suspects and help identify who committed the crimes.

A mobile access device is provided and includes a memory, a transceiver and a control module. The memory is configured to store incident information. The transceiver is configured to report the incident information to a relay station. The transceiver is at least one of ultra-wideband enabled or personal area network enabled. The control module is configured to: execute an emergency alerting application; transmit an alert signal from the mobile access device to the relay station indicating an incident has occurred; collect the incident information including at least one of (i) capturing audio or video of the incident, or (ii) receiving a descriptive comments from a user of the mobile access device; generate a report message including the incident information; and perform countermeasures including sending the report message to the relay station. At least one of the alert signal or the report message includes a unique signal identifier.

In other features, the unique signal identifier is an ultra-wideband signal identifier or a Bluetooth® low energy signal identifier.

In other features, the transceiver is ultra-wideband enabled and Bluetooth® enabled.

In other features, the transceiver is personal area network enabled and transmits signals at 2.4 GHz.

In other features, the control module is configured to aid in determining a location of the mobile access device by performing an ultra-wideband or Bluetooth® signal exchange with the relay station.

In other features, the control module is configured to determine distances between the mobile access device and nearby objects and report the distances to the relay station.

In other features, the control module is configured to receive the descriptive comments as an input from the user of the mobile access device and transmit the descriptive comments to the relay station via an ultra-wideband signal.

In other features, a relay station is provided and includes a memory, a transceiver and a control module. The memory is configured to store incident information. The transceiver is configured to receive the incident information from first mobile access devices and report the incident information to at least one of a central monitoring station or an emergency responding station. The transceiver is at least one of ultra-wideband enabled or personal area network enabled. The control module is configured to: identify the first mobile access devices based on unique signal identifiers of signals received from the first mobile access devices; determine locations of the first mobile access devices; combine the identities and locations of the first mobile access devices with the received incident information to generate a report; and perform a countermeasure including transmitting, via the transceiver, the report to the at least one of the central monitoring station or an emergency responding station.

In other features, the control module is configured to determine locations of the first mobile access devices using ultra-wideband signal transmission.

In other features, the control module is configured to determine locations of the relay station and objects nearby using Bluetooth signal transmission.

In other features, the control module is configured to: identify at least one of owners or users of the first mobile access devices based on the identities of the first mobile access devices; and include the identities of the at least one of the owners or users of the first mobile access devices in the report.

In other features, the control module is configured to: identify and determine locations of second mobile access devices, where the second mobile access devices are at least one of (i) not reporting incident information, or (ii) not transmitting an alert signal associated with the incident; identify at least one of owners or users of the second mobile access devices based on the identities of the second mobile access devices; and include the identities of the at least one of the owners or users of the second mobile access devices in the report.

In other features, the control module is configured to: receive alert signals from the first mobile access devices, where the alert signals indicate an incident has occurred; prior to receiving the alert signals, determine locations of the first mobile access devices via Bluetooth® signal transmission to generate first location data; in response to receiving the alert signal, enable ultra-wideband signal transmission; determine locations of the first mobile access devices using ultra-wideband signal transmission to generate second location data; and report the first location data and the second location data to the at least one of the central monitoring station or an emergency responding station.

In other features, the control module is configured to actuate one or more controlled devices based on the incident information.

In other features, the control module is configured to: request additional incident information from the first mobile access devices; receive the additional incident information from the first mobile access devices; and report the additional incident information to the at least one of the central monitoring station or an emergency responding station.

In other features, a system is provided and includes: the relay station and antenna modules. The antenna modules are connected to the relay station and at remote locations away from the relay station. The antenna modules are configured to collect additional incident information and transmit the additional incident information back to the relay station.

In other features, a station is provided and includes a memory, a transceiver and a control module. The memory is configured to store incident information. The transceiver is configured to receive the incident information from 5G enabled towers and report the incident information to first responders via an emergency responding station. The control module is configured to: receive alert signals from the 5G enabled towers, where the alert signals indicate that an incident has occurred, where the alert signal indicate that the incident is being reported by first mobile access devices; analyze the incident information and determine locations of the first mobile access devices, where the incident information includes micro-location ultra-wideband based data; identify at least one of owners or users of the first mobile access devices based on the incident information; and inform the first responders the locations of the first mobile access devices and identities of the at least one of the owners or users of the first mobile access devices.

In other features, the control module is configured to: analyze the incident information and determine locations of second mobile access devices, where the incident information includes additional micro-location ultra-wideband based data; identify at least one of owners or users of the second mobile access devices based on the incident information; and inform the first responders the locations of the second mobile access devices and the identities of at least one of the owners or users of the second mobile access devices.

In other features, the incident information includes Bluetooth location data indicating estimated locations of the first mobile access devices. The control module is configured to inform the first responders the estimated locations of the first mobile access devices.

In other features, the control module is configured to: request additional incident information from the 5G towers; receive the additional incident information from the 5G towers; and report the additional incident information to the first responders.

Although the terms first, second, third, etc. may be used herein to describe various distances, periods, steps, elements, components, areas, and/or items, these distances, periods, steps, elements, components, areas, and/or items should not be limited by these terms, unless otherwise indicated. These terms may be only used to distinguish one distance, period, step, element, component, area, or item from another distance, period, step, element, component, area, or item. Terms such as "first," "second," and other numerical terms when used herein do not imply a sequence or order unless clearly indicated by the context. Thus, a first distance, period, step, element, component, area, or item discussed below could be termed a second distance, period, step, element, component, area, or item without departing from the teachings of the example embodiments.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A mobile access device comprising:
    a memory configured to store incident information;
    a transceiver configured to report the incident information to a first station, wherein the transceiver is at least one of ultra-wideband enabled or personal area network enabled; and
    a control module configured to
        execute an emergency alerting application,
        transmit an alert signal from the mobile access device to the first station indicating an incident has occurred,
        collect the incident information including at least one of anonymously or automatically capturing at least one of audio or video of the incident,
        generate a report message including the incident information,
        perform countermeasures including sending the report message to the first station including the captured at least one of the audio or video to the first station,
        wherein at least one of the alert signal or the report message includes a unique signal identifier,
        determine distances between the mobile access device and nearby objects and report the distances to the first station,
        transmit and receive, via the transceiver, ultra-wideband (UWB) signals to determine a location of the mobile access device, distances between the mobile access device and other devices, and distances between the mobile access device and objects; and
        report to the first station incident information including the location of the mobile access device, the distances between the mobile access device and the other devices, and the distances between the mobile access device and the objects.

2. The mobile access device of claim 1, wherein the unique signal identifier is an ultra-wideband signal identifier or a Bluetooth® low energy signal identifier having a unique signal signature, which is indicative of at least one of an owner or user of the mobile access device.

3. The mobile access device of claim 1, wherein the transceiver is ultra-wideband enabled and Bluetooth® enabled.

4. The mobile access device of claim 1, wherein the transceiver is personal area network enabled and transmits signals at 2.4 GHz.

5. The mobile access device of claim 1, wherein the control module is configured to aid in determining a location of the mobile access device by performing an ultra-wideband or Bluetooth® signal exchange with the first station.

6. The mobile access device of claim 1, wherein the control module is configured to receive descriptive comments as an input from a user of the mobile access device and transmit the descriptive comments to the first station via an ultra-wideband signal.

7. The mobile access device of claim 1, wherein the control module is configured to anonymously capture and report the at least one of audio or video of the incident.

8. The mobile access device of claim 1, wherein the control module is configured to automatically capture and report the at least one of audio or video of the incident.

9. The mobile access device of claim 1, wherein the control module is configured to execute the emergency alerting application in response to receiving at least one of a predetermined sequence or predetermined pattern of taps on the mobile access device.

10. The mobile access device of claim 1, wherein the control module is configured to alert a user to at least one of remain silent, hide, or move such that a barrier is between the user and at least one of an assailant or a criminal.

11. The mobile access device of claim 1, wherein:
at least one of the alert signal or the report message includes a unique signal identifier; and
the control module is configured to, in response to receiving a request in a non-audible format for additional information regarding the incident, display questions to a user to obtain the addition information from the user and generate a response signal including the additional information based on a non-audible response from the user regarding the questions.

12. A mobile access device comprising:
a memory configured to store incident information;
a transceiver configured to report the incident information to a first station, wherein the transceiver is at least one of ultra-wideband enabled or personal area network enabled; and
a control module configured to
execute an emergency alerting application,
transmit an alert signal from the mobile access device to the first station indicating an incident has occurred,
collect the incident information including at least one of (i) capturing audio or video of the incident, or (ii) receiving descriptive comments from a user of the mobile access device,
generate a report message including the incident information,
perform countermeasures including (i) sending the report message to the first station, and (ii) signaling one or more other mobile access devices to generate an audible alarm to scare off at least one of an assailant or a criminal,
wherein at least one of the alert signal or the report message includes a unique signal identifier,
determine distances between the mobile access device and nearby objects and report the distances to the first station,
transmit and receive ultra-wideband signals to determine a location of the mobile access device, distances between the mobile access device and other devices, and distances between the mobile access device and objects, and
report to the first station information including the location of the mobile access device, the distances between the mobile access device and the other devices, and the distances between the mobile access device and the objects.

13. An incident reporting and preventing system comprising:
the mobile access device of claim 1, wherein the mobile access device is one of a first plurality of mobile access devices; and
the first station comprising
a memory configured to store incident information received from the first plurality of mobile access devices including the incident information reported by the one of the first plurality of mobile access devices,
a transceiver configured to receive the incident information from the first plurality of mobile access devices and report the incident information from the first plurality of mobile access devices to at least one of a central monitoring station or an emergency responding station, wherein the transceiver of the first station is at least one of ultra-wideband enabled or personal area network enabled, and
a control module configured to
identify the first plurality of mobile access devices based on unique signal identifiers of signals received from the first plurality of mobile access devices,
determine locations of the first plurality of mobile access devices,
combine the identities and locations of the first plurality of mobile access devices with the incident information received from the first plurality of mobile access devices to generate a report, and
perform a countermeasure including transmitting, via the transceiver of the first station, the report to the at least one of the central monitoring station or the emergency responding station.

14. The incident reporting and preventing system of claim 13, wherein the control module is configured to determine locations of the first plurality of mobile access devices using ultra-wideband signal transmission.

15. The incident reporting and preventing system of claim 13, wherein the control module is configured to determine locations of the first station and objects nearby using Bluetooth® signal transmission.

16. The incident reporting and preventing system of claim 13, wherein the control module is configured to:
identify at least one of owners or users of the first plurality of mobile access devices based on the identities of the first plurality of mobile access devices; and
include the identities of the at least one of the owners or users of the first plurality of mobile access devices in the report.

17. The incident reporting and preventing system of claim 13, wherein the control module is configured to:
identify and determine locations of a second plurality of mobile access devices, wherein the second plurality of mobile access devices are at least one of (i) not reporting incident information, or (ii) not transmitting an alert signal associated with the incident;

identify at least one of owners or users of the second plurality of mobile access devices based on the identities of the second plurality of mobile access devices; and include the identities of the at least one of the owners or users of the second plurality of mobile access devices in the report.

18. The incident reporting and preventing system of claim 13, wherein the control module is configured to:

receive alert signals from the first plurality of mobile access devices, wherein the alert signals indicate an incident has occurred;

prior to receiving the alert signals, determine locations of the first plurality of mobile access devices via Bluetooth® signal transmission to generate first location data;

in response to receiving the alert signal, enable ultra-wideband signal transmission;

determine locations of the first plurality of mobile access devices using ultra-wideband signal transmission to generate second location data; and report the first location data and the second location data to the at least one of the central monitoring station or the emergency responding station.

19. The incident reporting and preventing system of claim 13, wherein the control module is configured to actuate one or more controlled devices based on the incident information.

20. The incident reporting and preventing system of claim 13, wherein the control module is configured to:

request additional incident information from the first plurality of mobile access devices;

receive the additional incident information from the first plurality of mobile access devices; and report the additional incident information to the at least one of the central monitoring station or the emergency responding station.

21. The incident reporting and preventing system of claim 13, further comprising a plurality of antenna modules connected to the first station and at remote locations away from the first station, wherein the plurality of antenna modules are configured to collect additional incident information and transmit the additional incident information back to the first station.

22. An incident reporting and preventing system comprising:

the mobile access device of claim 1, wherein the mobile access device is one of a first plurality of mobile access devices; and the first station comprising a memory configured to store incident information received from the first plurality of mobile access devices including the incident information reported by the one of the first plurality of mobile access devices, a transceiver configured to receive the incident information from 5G enabled towers and report the incident information to first responders via an emergency responding station, and a control module configured to receive alert signals from the 5G enabled towers, wherein the alert signals indicate that an incident has occurred, wherein the alert signal indicate that the incident is being reported by the first plurality of mobile access devices, analyze the incident information and determine locations of the first plurality of mobile access devices, wherein the incident information includes micro-location ultra-wideband based data, identify at least one of owners or users of the first plurality of mobile access devices based on the incident information, and inform the first responders the locations of the first plurality of mobile access devices and identities of the at least one of the owners or users of the first plurality of mobile access devices.

23. The incident reporting and preventing system of claim 22, wherein the control module is configured to:

analyze the incident information and determine locations of a second plurality of mobile access devices, wherein the incident information includes additional micro-location ultra-wideband based data;

identify at least one of owners or users of the second plurality of mobile access devices based on the incident information; and inform the first responders the locations of the second plurality of mobile access devices and the identities of the at least one of the owners or users of the second plurality of mobile access devices.

24. The incident reporting and preventing system of claim 22, wherein:

the incident information includes Bluetooth® location data indicating estimated locations of the first plurality of mobile access devices; and the control module is configured to inform the first responders the estimated locations of the first plurality of mobile access devices.

25. The incident reporting and preventing system of claim 22, wherein the control module is configured to:

request additional incident information from the 5G enabled towers;

receive the additional incident information from the 5G enabled towers; and report the additional incident information to the first responders.

* * * * *